US011532208B2

(12) United States Patent
Tam et al.

(10) Patent No.: US 11,532,208 B2
(45) Date of Patent: Dec. 20, 2022

(54) GAMING MACHINE WITH CONCURRENT ACTIVATABLE WAGER OPTIONS AND INDIVIDUALLY SELECTABLE WAGER AMOUNTS

(71) Applicant: Aristocrat Technologies Australia Pty Limited, North Ryde (AU)

(72) Inventors: Billy Tam, Lindfield (AU); Nitin Gupta, Parramatta (AU); Gaurav Goel, Uttar Pradesh (IN); Pradip Rangari, Greater Noida (IN)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 17/347,299

(22) Filed: Jun. 14, 2021

(65) Prior Publication Data

US 2021/0304564 A1   Sep. 30, 2021

Related U.S. Application Data

(63) Continuation of application No. 15/922,269, filed on Mar. 15, 2018, now Pat. No. 11,062,565.

(30) Foreign Application Priority Data

Mar. 17, 2017   (AU) ............................... 2017900930

(51) Int. Cl.
*G07F 17/32*   (2006.01)
*G07F 17/34*   (2006.01)
*A63F 13/95*   (2014.01)

(52) U.S. Cl.
CPC ......... *G07F 17/3262* (2013.01); *A63F 13/95* (2014.09); *G07F 17/3213* (2013.01); *G07F 17/3244* (2013.01); *G07F 17/34* (2013.01)

(58) Field of Classification Search
CPC ............ G07F 17/3213; G07F 17/3244; G07F 17/3262; G07F 17/34
(Continued)

(56) References Cited

U.S. PATENT DOCUMENTS

| 8,313,382 B2 * | 11/2012 | Ward .................. G07F 17/3244 463/16 |
| 10,733,833 B2 * | 8/2020 | Maddux .............. G07F 17/3213 |

(Continued)

FOREIGN PATENT DOCUMENTS

AU   2018201927 A1   10/2018

OTHER PUBLICATIONS

Office Action dated May 13, 2020 for U.S. Appl. No. 15/922,269 (pp. 1-26).

(Continued)

*Primary Examiner* — Chase E Leichliter
(74) *Attorney, Agent, or Firm* — McAndrews, Held & Malloy, Ltd.

(57) ABSTRACT

In a gaming machine, a first display area displays a plurality of wager options. A wager selection mechanism is operable by a player to select more than one of the wager options to be activated concurrently and to individually select wager amounts to apply to each selected wager option. A second display area displays a game outcome of a spinning reel game of chance. A game outcome evaluator evaluates the game outcome based on each of the concurrently activated wager options and respective ones of the individually selected wager amounts.

20 Claims, 10 Drawing Sheets

(58) Field of Classification Search
USPC .......................................................... 463/20
See application file for complete search history.

(56) References Cited

U.S. PATENT DOCUMENTS

| | | | | |
|---|---|---|---|---|
| 2002/0183105 A1* | 12/2002 | Cannon | ................... | G07F 17/32 463/16 |
| 2003/0073480 A1* | 4/2003 | Thomas | .............. | G07F 17/3262 463/18 |
| 2004/0087360 A1* | 5/2004 | Chamberlain | ........... | G07F 17/32 463/25 |
| 2004/0162134 A1* | 8/2004 | Walker | ................ | G07F 17/3269 463/20 |
| 2005/0239542 A1* | 10/2005 | Olsen | ................. | G07F 17/3258 463/27 |
| 2007/0072667 A1* | 3/2007 | Limacher | ............ | G07F 17/3223 463/16 |
| 2007/0155475 A1* | 7/2007 | Gak | ......................... | G07F 17/32 463/20 |
| 2007/0161424 A1* | 7/2007 | Gatto | ...................... | G07F 17/34 463/20 |
| 2007/0243934 A1* | 10/2007 | Little | .................. | G07F 17/3225 463/40 |
| 2008/0026813 A1* | 1/2008 | Cannon | ............... | G07F 17/3244 463/18 |
| 2008/0045329 A1* | 2/2008 | Wilson | .................... | G07F 17/32 463/25 |
| 2008/0076521 A1* | 3/2008 | Little | ........................ | A63F 9/24 463/20 |
| 2008/0096639 A1* | 4/2008 | Okada | .................... | G07F 17/34 463/20 |
| 2008/0176643 A1* | 7/2008 | Phillips | ............... | G07F 17/3288 463/25 |
| 2009/0115133 A1* | 5/2009 | Kelly | ................... | G07F 17/3206 273/274 |
| 2010/0075744 A1* | 3/2010 | Baratti | ................. | G07F 17/3216 463/31 |
| 2010/0267449 A1* | 10/2010 | Gagner | .................. | G06F 3/0488 463/30 |
| 2012/0083328 A1* | 4/2012 | Huang | .................... | G07F 17/34 463/20 |
| 2012/0172107 A1* | 7/2012 | Acres | ...................... | G07F 17/34 463/16 |
| 2013/0178271 A1* | 7/2013 | Aponte | ................... | G07F 17/34 463/20 |
| 2014/0018149 A1* | 1/2014 | Conard | ............... | G07F 17/3244 463/20 |
| 2014/0024425 A1* | 1/2014 | Wolff | .................... | G07F 17/326 463/11 |
| 2014/0094256 A1* | 4/2014 | Hilbert | .................... | G07F 17/34 463/20 |
| 2014/0349734 A1* | 11/2014 | Saunders | ............ | G07F 17/3213 463/20 |
| 2015/0379804 A1* | 12/2015 | Casey | ................. | G07F 17/3244 463/20 |
| 2019/0051102 A1* | 2/2019 | Atkinson | ............ | G07F 17/3293 |
| 2020/0334955 A1* | 10/2020 | Carli | ................... | G07F 17/3209 |

OTHER PUBLICATIONS

Office Action dated Nov. 13, 2020 for U.S. Appl. No. 15/922,269 (pp. 1-12).
Australian Examination Report No. 1 for App. No. AU2019246924, dated Nov. 23, 2020, 3 pages.
Notice of Allowance dated Mar. 23, 2021 for U.S. Appl. No. 15/922,269 (pp. 1-11).

* cited by examiner

GAMING MACHINE WITH CONCURRENT ACTIVATABLE WAGER OPTIONS AND INDIVIDUALLY SELECTABLE WAGER AMOUNTS

RELATED APPLICATION(S)

The present application claims priority to U.S. Provisional patent application Ser. No. 15/922,269, filed Mar. 15, 2018, and entitled "GAMING MACHINE WITH CONCURRENT ACTIVATABLE WAGER OPTIONS AND INDIVIDUALLY SELECTABLE WAGER AMOUNTS" and claims priority to Australian Provisional Patent Application No. AU 2017900930 having a filing date of Mar. 17, 2017, both of which are incorporated herein by reference in their entireties.

FIELD

The present invention relates to a gaming machine and a method of operating a gaming machine.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. The RNG may be used to randomly determine the outcome of a game and symbols may then be selected which correspond to that outcome or to randomly select the symbols whose resulting combinations determine the outcome. Notably, some games may include an element of skill on the part of the player and are therefore not entirely random.

In existing spinning reel based gaming machines, symbols are typically selected by spinning a set of virtual or physical reels and stopping the reels at random positions. Typically, three or more symbols are selected for each reel and they are displayed in a series of side-by-side columns, most commonly in a grid—e.g. in grid of symbol display positions having five columns and three rows.

In many games, a player's wager is based on 1) how many win lines they play in each game and 2) an amount wagered per line, where the same amount is applied to each win line. The total wager on a play of the game is derived by multiplying the number of lines and the amount wagered per line.

Each win line is typically formed by a combination of symbol display positions (one from each reel) where the symbol display positions are located relative. When a player selects a particular number of lines, this is one of a number of pre-set options, less than the number of win lines, where all the lines are predetermined. For example, if a player selects three lines, these will usually be lines corresponding to three rows of symbols. Even in the case of a player making a selection to play one win line, the specific win line is fixed.

After symbols are selected, the gaming machine evaluates them by examining whether an active pay line has a winning combination of symbols that is specified in a pay table—e.g. 3, 4 or 5 of the same symbol. If there is a winning combination, an award is made based on the amount specified in the pay table and the amount wagered per line such that irrespective of the win line on which the combination appears, the same award is made.

It will be appreciated, that existing spinning reel based gaming machines provide very little flexibility to the player in selecting a wager. There is a need for alternative gaming machines.

SUMMARY

In a first aspect, the invention provides a gaming machine comprising:
a memory storing reel data defining a plurality of reels;
an outcome generator;
a wager selection mechanism comprising a first display area displaying a plurality of wager options, the wager selection mechanism operable by a player to select more than one of the plurality of wager options to be activated concurrently and to individually select wager amounts to apply to each selected wager option;
a second display area for displaying a game outcome of a spinning reel game of chance in which symbols are selected by the outcome generator for display at a plurality of columns of symbol display positions by selecting stopping positions for each of the plurality of reels; and
a game outcome evaluator configured to evaluate the game outcome based on each of the concurrently activated wager options and respective ones of the individually selected wager amounts.

In an embodiment, there is a dedicated reel for each of the symbol display positions such that a number of reels is the same as a number of symbol display positions.

In an embodiment, there are nine symbol display positions.

In an embodiment, each reel is composed of the same set of symbols such that the outcome generator can select the same symbol for each of the symbol display positions.

In an embodiment, there are three different symbols in each set of symbols.

In an embodiment, there are two different symbols in each set of symbols.

In an embodiment, the wager options include options corresponding to selection of an exact number of one of the symbols of the set of symbols.

In an embodiment, the wager options include options corresponding to selection of an exact number of each of the symbols of the set of symbols.

In an embodiment, the wager options include options corresponding to selection of each possible exact number of each of the symbols of the set of symbols In an embodiment, the memory stores data defining a plurality of win lines, and wherein the wager options allow a player to select specific ones of the win lines.

In a second aspect, the invention provides a method of operating a gaming machine, the method comprising:

displaying, as part of a wager selection mechanism, a plurality of wager options in a first display area;

receiving, via the wager selection mechanism, a selection of more than one of the plurality wager options to be activated concurrently;

receiving, via the wager selection mechanism, individual selections of wager amounts to apply to each selected wager option;

forming a game outcome of a spinning reel game of chance by selecting symbols for display at a plurality of columns of symbol display positions in a second display area, wherein the symbols are selected by selecting stopping positions for each of the plurality of reels; and evaluating the game outcome based on each of the concurrently activated wager options and respective ones of the individually selected wager amounts.

In a third aspect, the invention provides computer program code which when executed implements the above method.

In a fourth aspect, the invention provides a tangible computer readable medium comprising the above program code.

DETAILED DESCRIPTION

Figure 1:
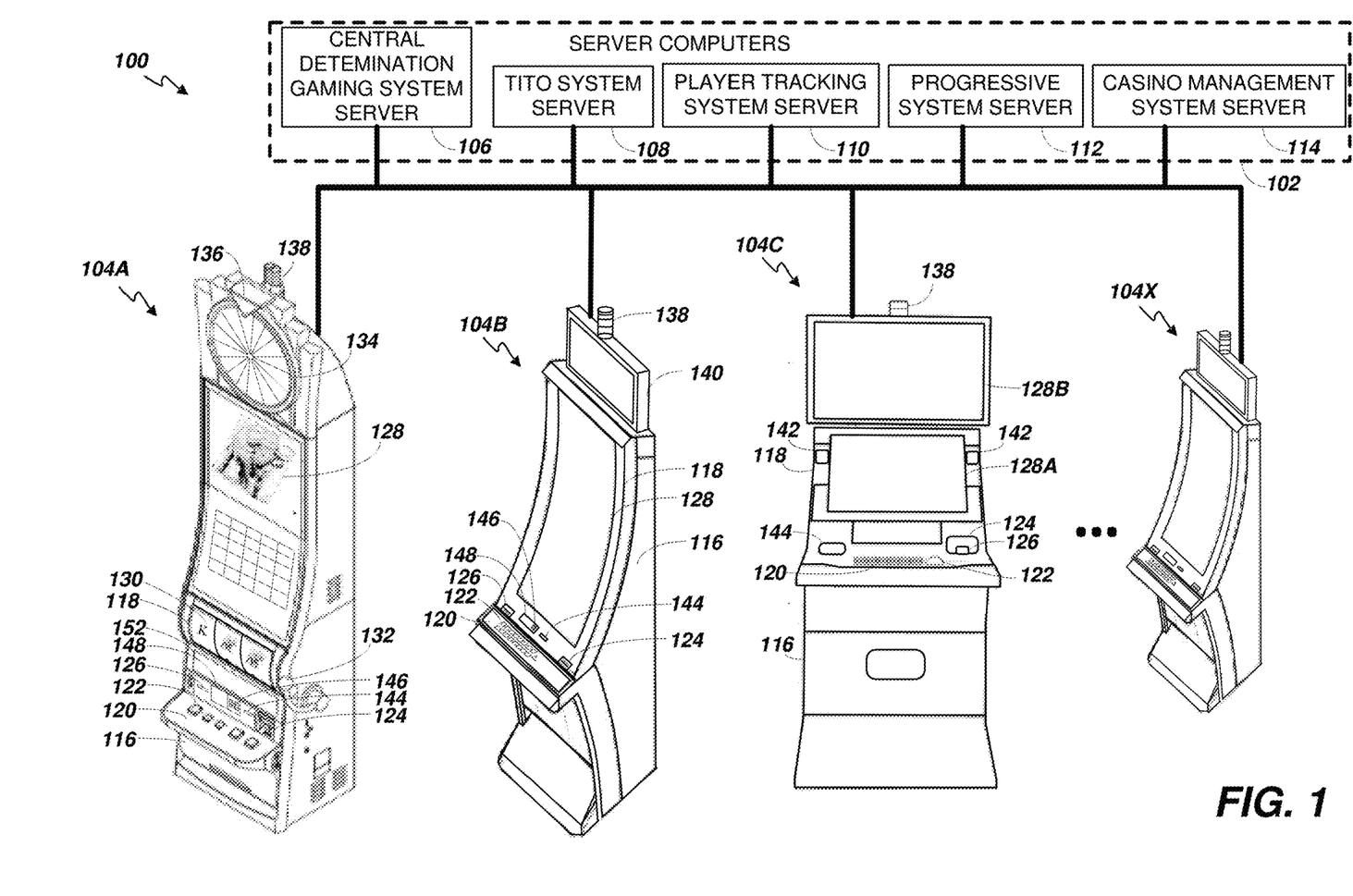
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a standalone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 128 comprising a number (typically 3 or 5) of mechanical reels 130 with various symbols displayed on them. The reels 130 are independently spun and stopped to show a set of symbols within the gaming display area 128 which may be used to determine an outcome to the game.

In many configurations, the gaming machine 104A may have a main display 128 (e.g., video display monitor) mounted to, or above, the gaming display area 128. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 118 which may be used to initiate game play.

Figure 2:
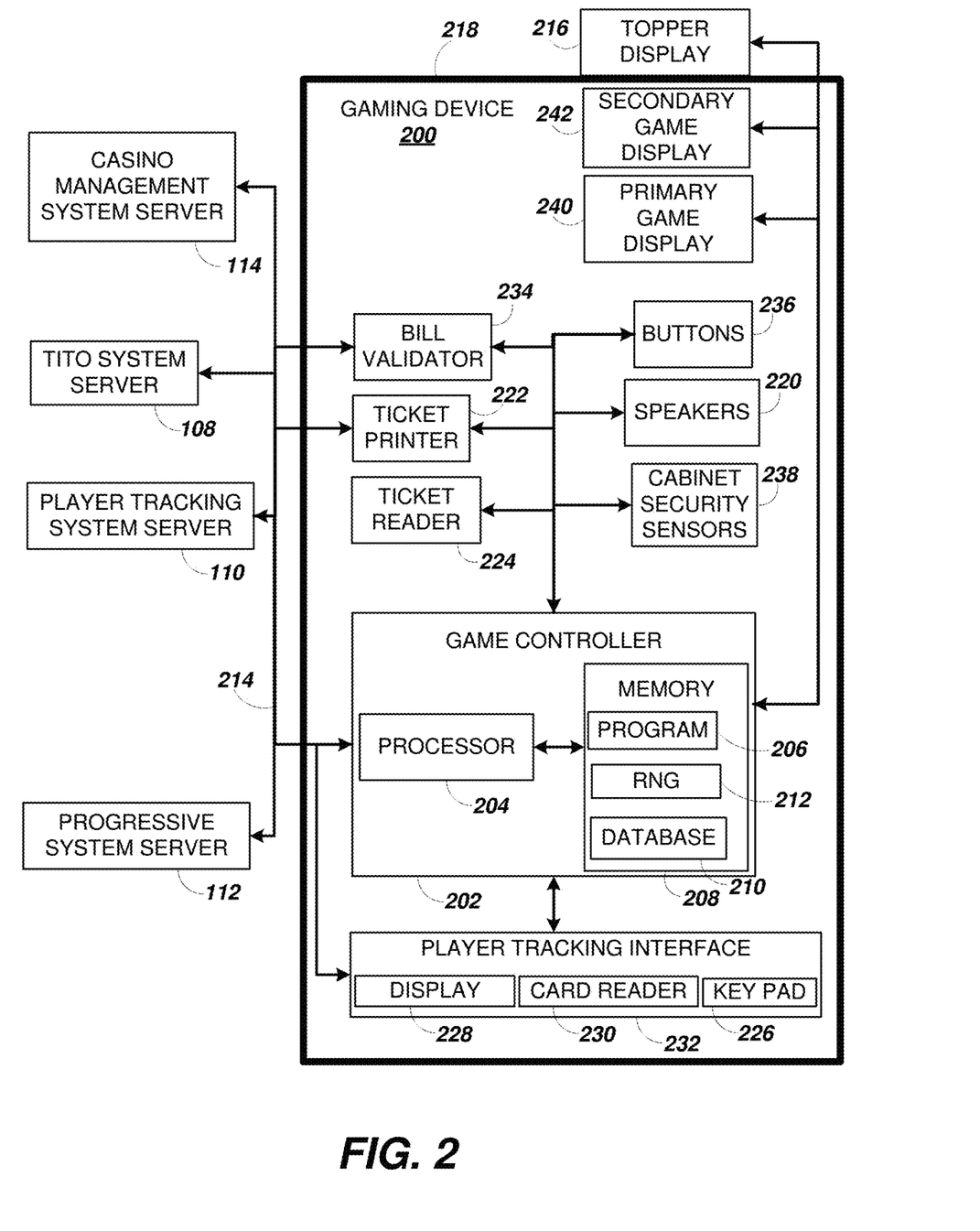
FIG. 2 is a block diagram showing various functional elements of an exemplary EGM.

Many or all the above described components can be controlled by circuitry (e.g., a gaming controller) housed inside the main cabinet 118 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 118 including a main door 116 which opens to provide access to the interior of the gaming device 104B. The main or service door 116 is typically used by service personnel to refill the ticket-out printer 126 and collect bills and tickets inserted into the bill validator 124. The main door 116 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, main display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208.

The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. For example, a credit meter may display, monitor, and/or indicate a player's credit balance. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202. In some embodiments, the bill validator 234 or the card reader 230 may detect whether a physical item representing a monetary value, such as, a bill or a player tracking card has been received, so as to initiate a wagering activity.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism, such as a coin acceptor (not shown) or bill validator 234 to establish a credit balance on the gamine machine. The credit balance may be increasable and decreasable based on a wagering activity. In some embodiments, the credit balance is displayed on a credit meter (not shown). In some other embodiments, the credit meter may be stored in the memory 208, and/or the casino management system server 114. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing or actuating a payout mechanism such as a cash out button to receive a ticket from the ticket printer 222). The ticket may be "cashed-in" for money or inserted into another machine to establish a credit balance for play.

Figure 3:
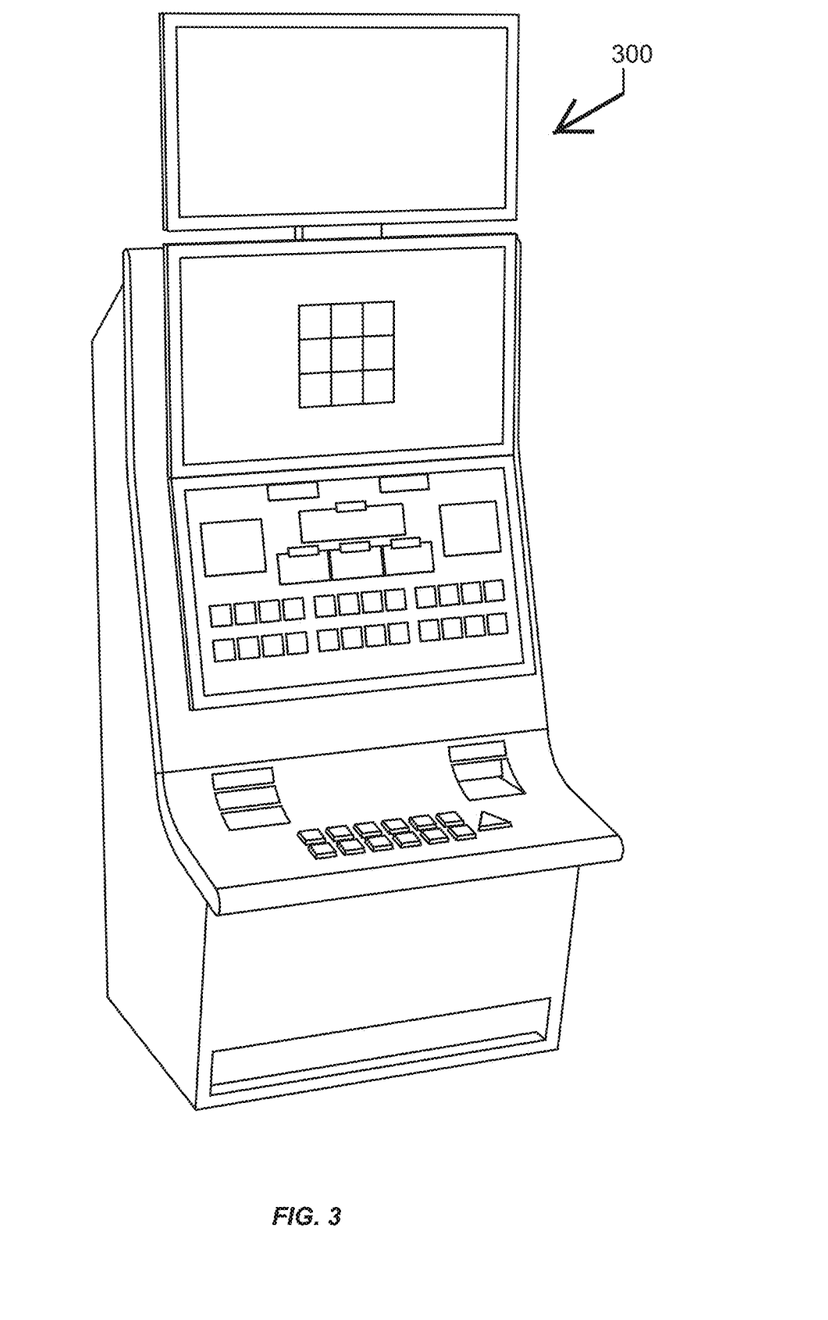
FIG. 3 illustrates an exemplary standalone gaming machine.
Figure 4:
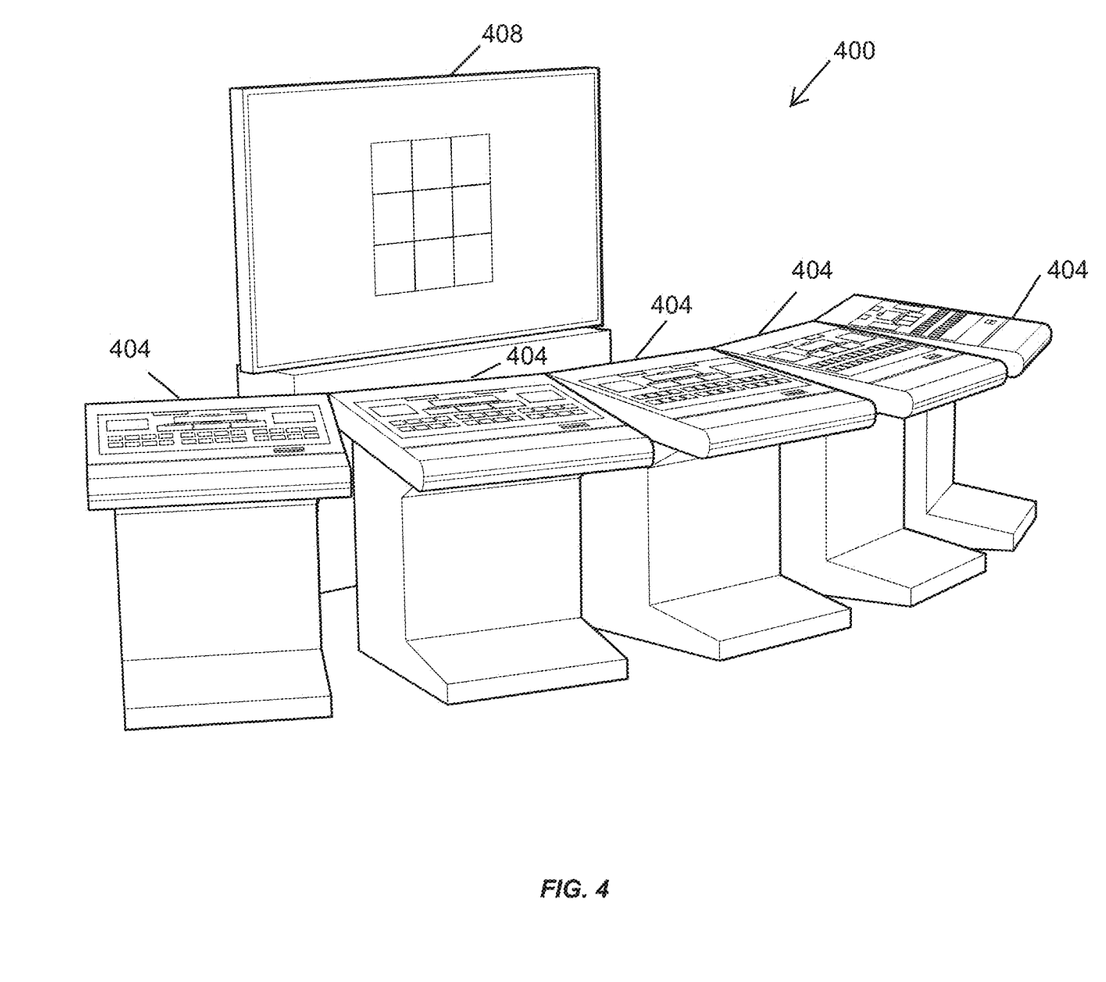
FIG. 4 illustrates a first system of gaming consoles with a combined center display.
Figure 5:
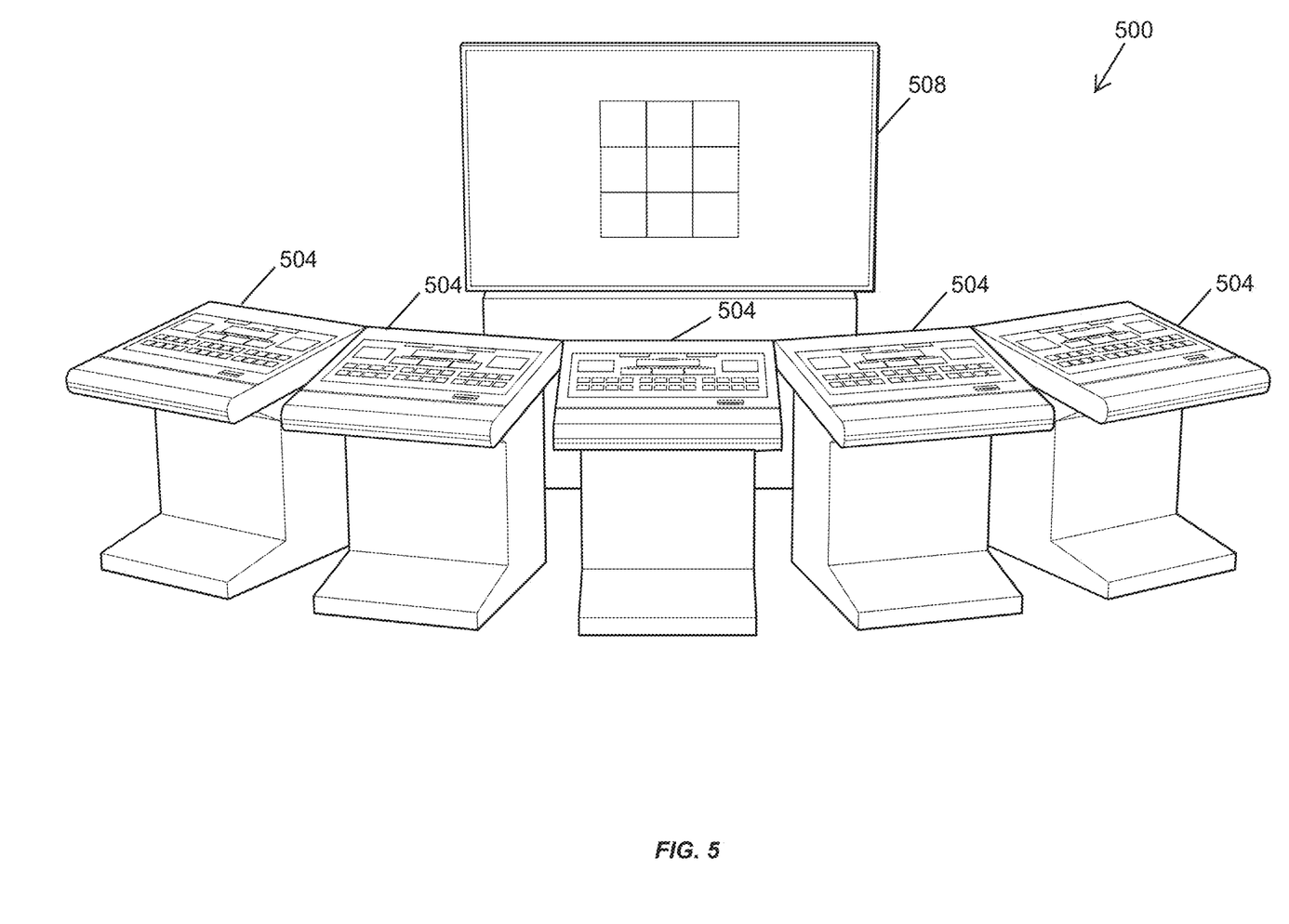
FIG. 5 illustrates a second system of gaming consoles with a combined center display.

FIG. 3 illustrates an exemplary standalone gaming machine 300. FIG. 4 illustrates a first system 400 of gaming consoles 404 with a combined center display 408. FIG. 5 illustrates a second system 500 of gaming consoles 504 with a combined center display 508.

Figure 6:
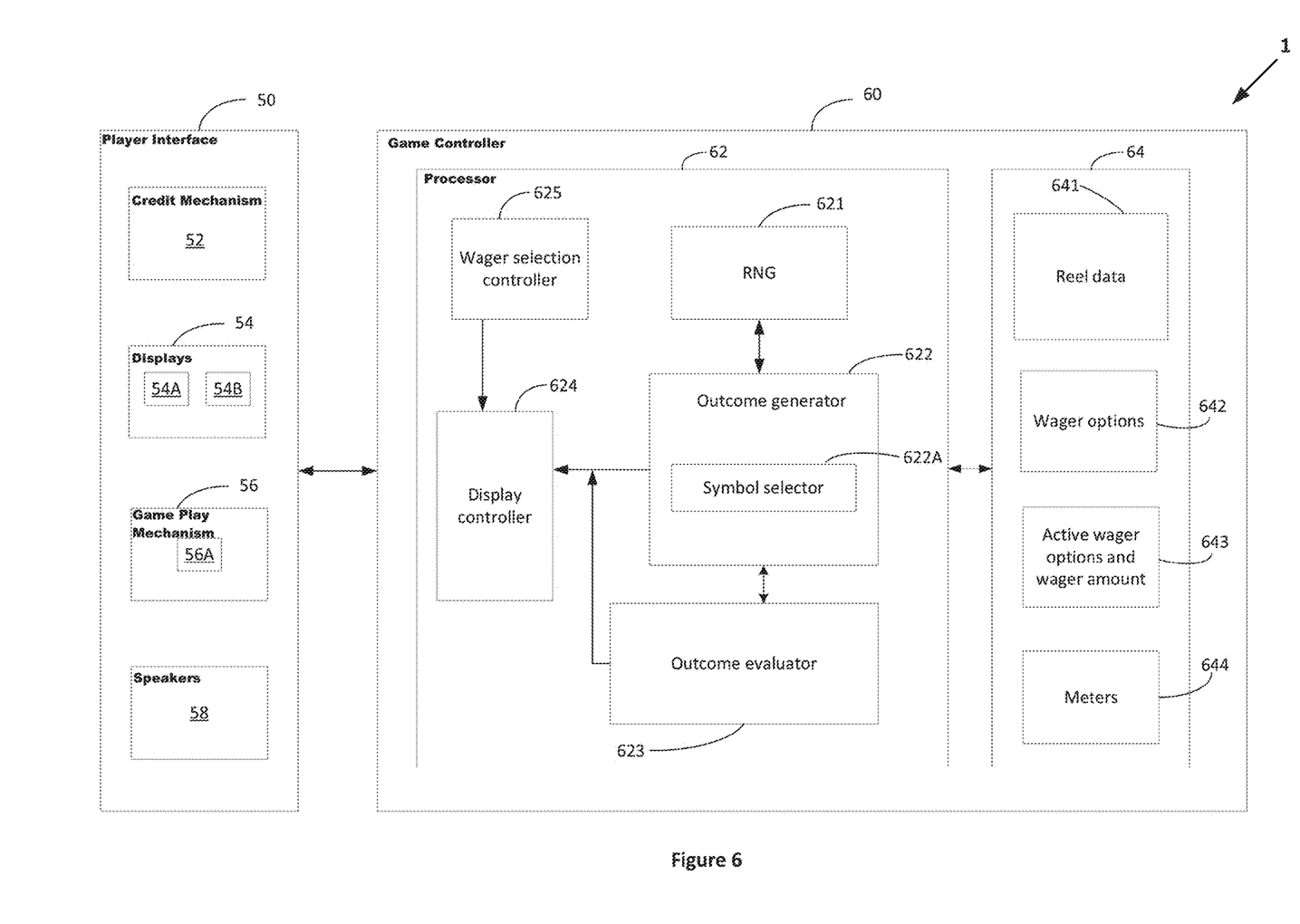
FIG. 6 is a further block diagram of a gaming system.

Referring to FIG. 6 there is shown a more detailed block diagram of a gaming machine 1 of a preferred embodiment having a player interface 50. As shown in FIG. 6, the player interface 50 has a credit mechanism 52, a plurality of displays 54, including a first display 54A in which a first display area is displayed (e.g. corresponding to display 240 in FIG. 2) and a second display 54B in which a second display area is displayed (e.g. corresponding to top box display 216) and in which game outcomes are displayed. Advantageously, a wager selection mechanism is displayed in the first display area concurrently with game outcomes being displayed in the second display area.

Figure 8:
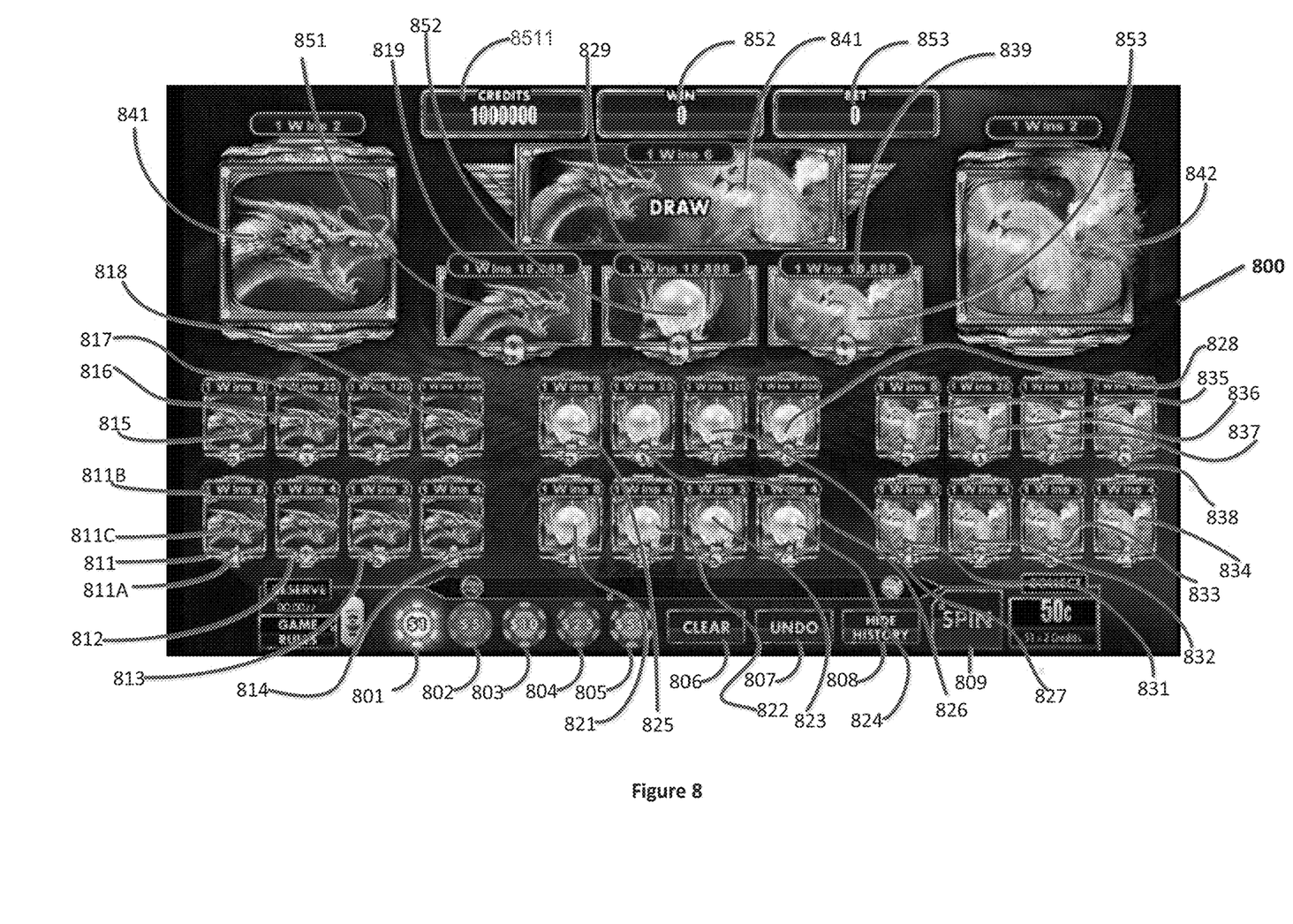
FIG. 8 illustrates a wager selection mechanism of a first example.
Figure 10:
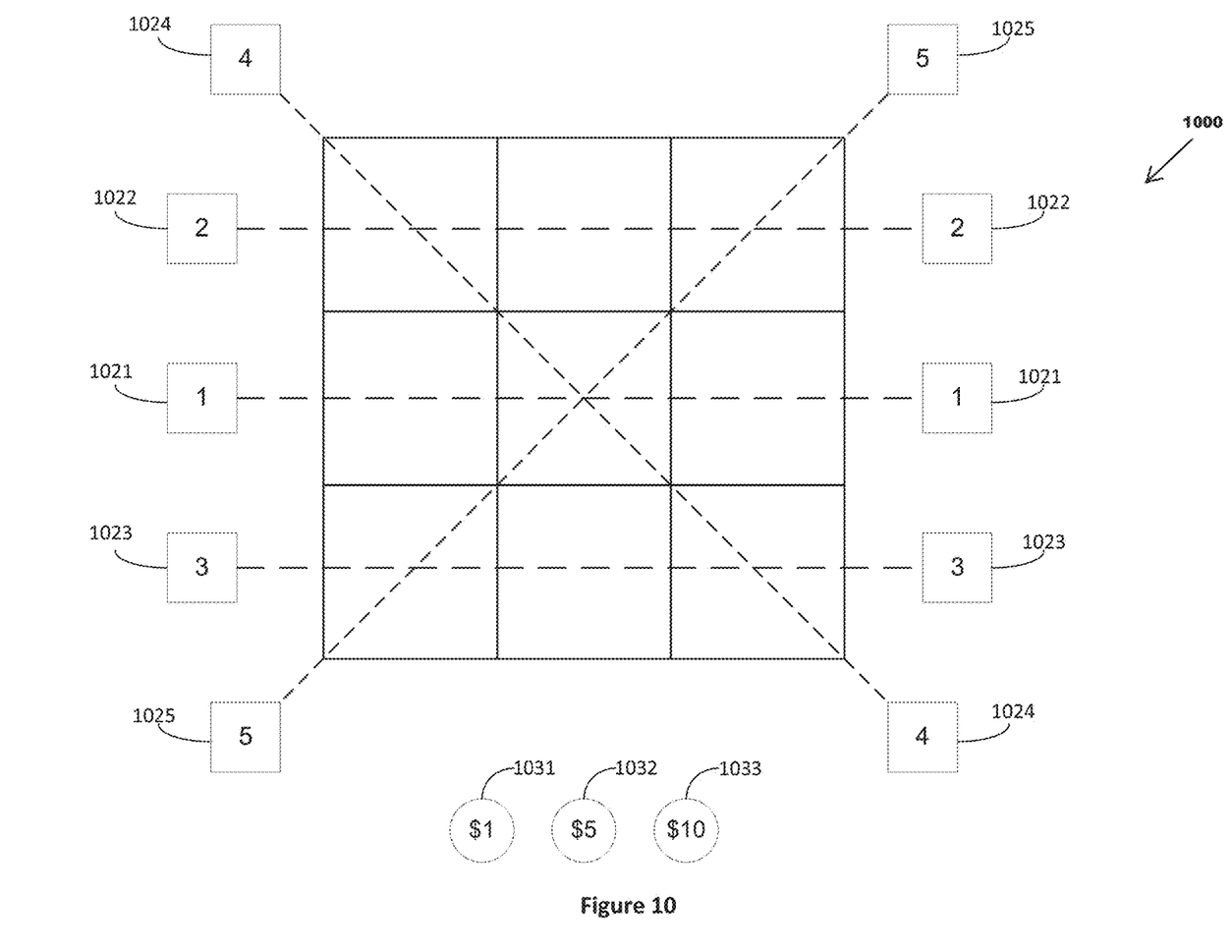
FIG. 10 illustrates a game selection mechanism of a second example.

In this respect, a game play mechanism 56 includes a wager selection mechanism 56A (described in more detail below) which allows a player to concurrently activate more than one wager. Examples of wager selection mechanisms are shown in FIGS. 8 and 10.

A game controller 60 is provided by a processor 62 and a memory 64. The processor implements a number of modules based on program code stored in memory 64. However, it will be apparent to a person skilled in the art that in other embodiments, these modules could be provided by a dedicated circuitry. One of the modules is a wager selection controller 625 which receives instructions via the wager selection mechanism 56A and updates the set of active wager options and wager amounts 643 stored in memory 64. The wager selection controller 625 also responds to the player selection of wager options 642 to update the display in the first display area 54A to indicate to the player which wager options 642 have been selected. Further, the wager selection controller 625 is responsive to other touch screen buttons displayed such as the "clear" button 806 shown in FIG. 8 which clears all current wagers and the "undo" button 807 which removes the previously activated wager option. Once the player has selected their desired wager options, they can initiate a play of the game, for example, by touching a spin button 809 as shown in FIG. 8. Alternatively, or additionally, a physical button may be provided on the gaming machine console as part of the game play mechanism 56 which allows the player to initiate a play of the game. In the embodiments, once the player spins the reels, the outcome generator uses a symbol selector 622A to select symbols from each of a plurality of reels stored as reel data 641. In an example, the symbol selector 622A selects symbols by randomly selecting a stopping position for each of the reels. To this end, the symbol selector 622A obtains a number from a random number generator 621 and by means of a table stored in memory 63, maps the random number to a particular stopping position. In some embodiments, the table may be unevenly weighted such that particular stopping positions are more likely to occur than others.

In the embodiments, there are reels for each of the symbol display positions such that the symbol at each symbol display position is independently selected of the other symbol display positions. In one example, there are nine symbol display positions and hence nine reels. In other embodiments multiple symbols may be selected from each reel to display in a column of symbol display positions.

Once the symbols have been selected, they are displayed on the second display 54B in second display area under the control of the display controller 624. The outcome evaluator 623 evaluates the active wager options 643. In this respect, the outcome evaluator 623 independently assesses each active wager option based on a prize associated with the wager option 642 and an amount wagered on that specific wager option. Accordingly, where the awards for a particular wager options are the same, different prizes may be awarded because different amounts have been wagered.

In this respect, in some embodiments, the wager options are configured so that a plurality of the wager options can correspond to winning outcomes simultaneously other wager options are inconsistent with one another occurring. For example, if a game outcome corresponding to a wager option A occurs, it may not be possible for a game outcome corresponding to wager B occurring.

In this respect, further understanding of the wager selection mechanism can be obtained by reference to FIG. 8 which is a screenshot 800 of an example of a first display area which incorporates a wager selection mechanism. In this respect, the screen is a touch screen display and the player can select wager options by interacting with the display. In the present example, there are a plurality of different wager amounts 801, 802, 803, 804 and 805 corresponding to 1, 5, 10, 25, and 50 credits respectively. In the example, the different wager amounts are represented as casino chips. The $1.00 chip (which corresponds to 1 credit) 801 is highlighted to show that it is presently activated by the player. The player places a wager by dragging the chip to a sub area of the display corresponding to the wager option which the player desires to wager on. In this example, there are 30 different wager options in four groups of wager options 811-819, 821-829, 831-839, and 841-843.

In other embodiments, a player can select a wager by means of a gesture on one of wager options. For example, by tap and hold gesture which will add a number of credits corresponding to the highlighted one of the tokens 801-805.

The player interacts with the wager selection mechanism 56A until they are satisfied that they have placed all the wagers they want. During this time, the player can also clear with the clear button 806 or undo with the undo button 807 existing wagers or hide a history of previous results 808.

The gaming machine also shows the player's current credit balance 8511 and amount won 852, if any, that hasn't been transferred to the credit meter as well as the amount 853 of a current wager.

Most of the icons indicating wager options have three components as can be see with reference to wager option 811. These components are an image 811C of a symbol that the player is selecting, a number 811A of the symbol that the player is selecting, and a message 811B as to what the prize will be if that wagering option is selected and occurs in the game outcome. In an example message 811B indicates to the player that a wager of 1 credit will win 8 credits if the wagering option occurs in the game outcome.

Figure 9:
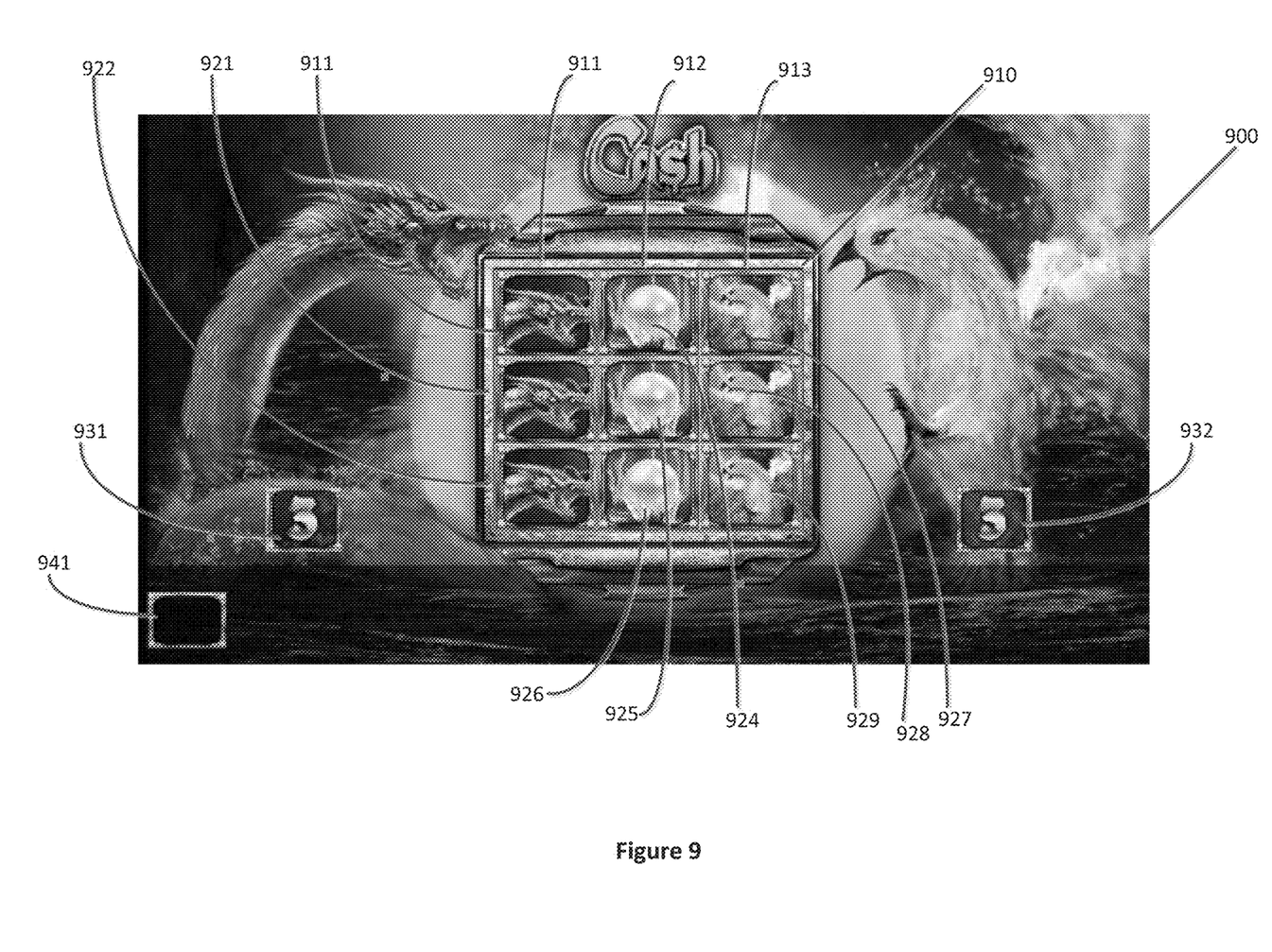
FIG. 9 illustrates a game outcome of the first example.

Each of wager options 811-819, 821-829, and 831-839 correspond to the player selecting an exact number of specific symbols to occur in a game outcome. Thus, as the player can wager on exact numbers of symbols, a wider range of wager options can be provided. In this example, only 3 different symbols are provided, Dragon 851, Pearl 852 and Phoenix 853 symbols. Three additional wagering options 841-843 correspond to there being more Dragon than Phoenix symbols 841, more Phoenix than Dragon symbols 842 and the same number of Phoenix and Dragon symbols 843. In this respect, FIG. 9 shows an example screenshot 900 of a gaming machine after a game outcome has been generated by selecting individual symbols from each of nine reels to display at nine display positions arranged in three columns 911, 912 and 913. Dragon symbols have been selected at symbol display positions 921, 922 and 933; Pearl symbols have been selected at symbol display positions 924, 925 and 926; and Phoenix symbols have been selected at symbol display positions 927, 928 and 929. The occurrence of three Dragon symbols and three Phoenix symbols are also indicated on counters 931 and 932 respectively to assist a player to understand how wager options 841-843 will be evaluated. Additional sub display area 941 can be used to indicate whether there were more Phoenix or more Dragon symbols in a previous game outcome.

Accordingly, it will be apparent that an advantage of the embodiment is that it provides a more flexibility for the player in respect of selecting wagering options for the spinning reel game. Further, in the example shown in FIGS. 8 and 9, the player does not need the winning outcome to occur on a specific win line that is active. Instead, the player can chose an exact number or relative number of symbols that will appear. Additionally, unlike traditional gaming machines, the player can independently specify the wager on different wagering options and the gaming machine is configured to evaluate game outcomes based on different wager amounts applying to different wager options.

Figure 7:
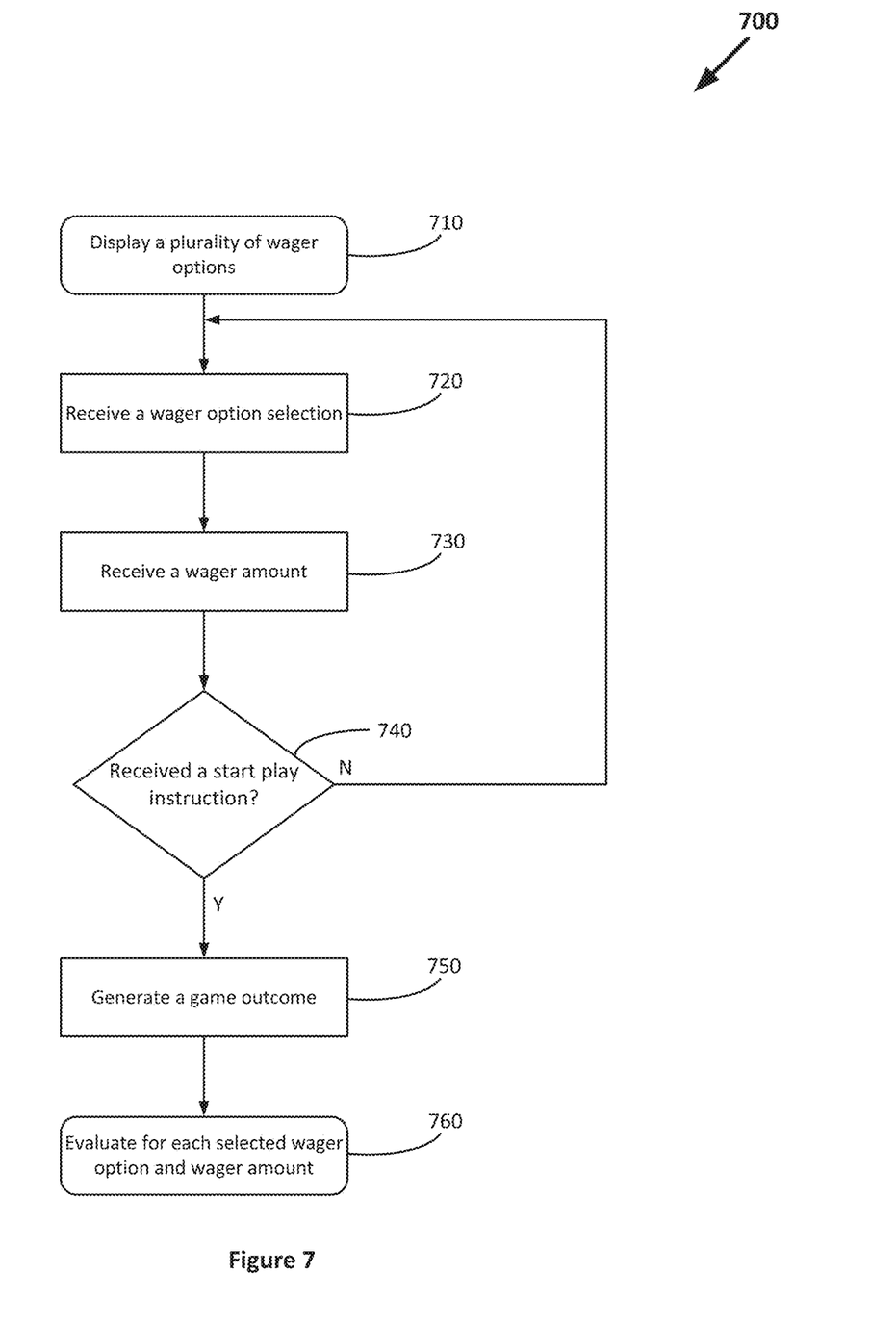
FIG. 7 is a flow chart of an embodiment.

In summary, as shown in FIG. 7, a method 700 of an embodiment involves displaying a plurality of wager options at step 710, receiving a wager option selection at step 720, and receiving the wager amount at step 730 in respect of the selected wager option. At step 740, it is determined whether a start play instruction has been received and until a start play instruction has been received, the gaming machine can carry out steps 720 and 730 again and again. Once a start play instruction is received step 740, the gaming machine generates at step 750 a game outcome, and it is evaluated at step 760 for each selected wager option and wager amount.

FIG. 10 illustrates a wager option selection mechanism 1000 of a further example. In this example, game outcomes are generated in the same manner described in connection with FIG. 9 by individually selecting stopping positions for each of 9 reels in order to populate a grid of symbol display position comprising three columns and three rows as symbol display positions. As in that example, there are only be a limited number of symbols, for example, three or two symbols that can be selected. Alternately, the reel strips may include a wider variety of symbols. In still a further alternative, there may be a single reel strip for each column.

In this example, the player can select to play any of first to fifth win lines 1021-1025. To do so, the player drags one of credit icons 1031, 1032, and 1033 to boxes corresponding to each of the first to fifth pay lines 1021-1025. Unlike conventional gaming machines, the win lines are not pre-set such that the player can individually determine which of the win lines are to be selected and active. For example, a player may prefer the diagonal win lines 1024 and 1025 to the horizontal win lines 1021-1023 and chose to wager on these. Further, by dragging different credit icons 1031 to 1033 to different ones of the boxes corresponding to the respective win lines, the player can differentially apply wagers to the pay lines. For example, a five credit wager to one win line and a one credit wager to another win line. As described above, each wager option is evaluated individually once a game outcome is generated.

Typically, a winning outcome will result in some form of award being made such as an award of credits. Such an award may never actually be physically received by a player. For example, many gaming machines provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 208) or as a data signal (for example, by transmitting it from a server). Further different parts of the program code can be executed by different devices, for example in a client server relationship. Persons skilled in the art, will appreciate that program code provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming machine operable to award a player-selected combination having a predetermined number of player-selected symbols, the gaming machine comprising:
a touch screen a) providing a plurality of display positions, and b) operable to display a plurality of wager options and a plurality of wager amounts, the plurality of wager amounts being draggable to one or more of the plurality of wager options, each of the plurality of wager options being associated with a respective symbol and an awardable prize when the respective symbol is displayed; and
a game controller comprising a processor and a memory storing i) a game symbol set, each game symbol being associated with two or more of the plurality of wager options, and ii) instructions, which, when executed, cause the processor to at least:
form the player-selected combination having the predetermined number of player-selected symbols with a first wager option of the plurality of wager options that have two or more of the plurality of wager amounts been dragged to be concurrently applied to the first wager option, the first wager option being associated with a first symbol and a first prize,
control the plurality of display positions to respectively display a plurality of symbols selected from the game symbol set based on a random outcome generated by a random number generator when the two or more of the plurality of wager amounts have been dragged to the first wager option, and
award the first prize when the plurality of symbols displayed at the plurality of display positions include the first symbol based on the two or more of the plurality of wager amounts concurrently applied to the first wager option in the player-selected combination having the predetermined number of player-selected symbols.

2. The gaming machine of claim 1, wherein the first wager option indicates a first number of the first symbol to occur to win the first prize, and wherein the instructions, when executed, further cause the processor to evaluate the plurality of symbols displayed include the first number of the first symbol.

3. The gaming machine of claim 2, wherein the first number of the first symbol indicates two or more of the first symbol.

4. The gaming machine of claim 1, wherein the instructions, when executed, further cause the processor to provide additional game symbols in the game symbol set to widen the plurality of wager options available to a player.

5. The gaming machine of claim 1, wherein the plurality of wager options include a plurality of player-selectable pay lines.

6. The gaming machine of claim 5, wherein the instructions, when executed, further cause the processor to receive a first wager amount at a first player-selectable pay line, and the first wager amount and a second wager amount at a different second play-selectable pay line.

7. The gaming machine of claim 1, wherein the instructions, when executed, further cause the processor to receive a first wager amount and a second wager amount at the first wager option, and the first wager amount and a different third wager amount at a second wager option.

8. A method of awarding a player-selected combination having a predetermined number of player-selected symbols on a gaming machine having a) a touch screen i) providing a plurality of display positions, and ii) operable to display a plurality of wager options and a plurality of wager amounts, the plurality of wager amounts being draggable to one or more of the plurality of wager options, each of the plurality of wager options being associated with a respective symbol and an awardable prize when the respective symbol is displayed, and a game controller comprising a processor and a memory storing i) a game symbol set, each game symbol being associated with two or more of the plurality of wager options, and ii) instructions, which, when executed, cause the processor to initiate a game, the method comprising:

determining, when two or more of the plurality of wager amounts have been dragged to be concurrently applied to a first wager option of the plurality of wager options, the first wager option being associated with a first symbol and a first prize based on the player-selected combination having the predetermined number of player-selected symbols;

displaying a plurality of symbols selected from the game symbol set based on a random outcome generated by a random number generator at the plurality of display positions, respectively, when the two or more of the plurality of wager amounts have been applied to the first wager option; and determining the first prize when the plurality of symbols displayed at the plurality of display positions include the first symbol based on the two or more of the plurality of wager amounts concurrently applied to the first wager option in the player-selected combination having the predetermined number of player-selected symbols.

9. The method of claim 8, wherein the first wager option indicates two or more of the first symbol to occur to win the first prize, further comprising evaluating the plurality of symbols displayed for the two or more of the first symbol.

10. The method of claim 8, further comprising providing additional game symbols in the game symbol set to widen the plurality of wager options available to a player.

11. The method of claim 8, wherein the plurality of wager options include a plurality of player-selectable pay lines.

12. The method of claim 11, further comprising receiving a first wager amount and a second wager amount at a first player-selectable pay line, and receiving the first wager amount and a different third wager amount at a different second play-selectable pay line.

13. The method of claim 8, wherein the two or more of the plurality of wager amounts include a first wager amount and a second wager amount, further comprising receiving the first wager amount and the second wager amount at the first wager option, and receiving the first wager amount and a different third wager amount at a second wager option.

14. A non-transitory computer-readable medium comprising i) a game symbol set, each game symbol being associated with two or more of the plurality of wager options, and ii) instructions, for conducting a game on a gaming system including a) a touch screen i) providing a plurality of display positions, and ii) operable to display a plurality of wager options and a plurality of wager amounts, the plurality of wager amounts being draggable to one or more of the plurality of wager options, each of the plurality of wager options being associated with a respective symbol and an awardable prize when the respective symbol is displayed based on a player-selected combination having a predetermined number of player-selected symbols, and a game controller, and wherein the instructions, which, when executed, cause the game controller to perform the steps of:

determining when two or more of the plurality of wager amounts have been dragged to a first wager option, the first wager option being associated with a first symbol and a first prize;

applying concurrently the two or more of the plurality of wager amounts to the first wager option in the player-selected combination having the predetermined number of player-selected symbols;

displaying a plurality of symbols selected from the game symbol set based on a random outcome generated by a random number generator at the plurality of display positions, respectively, when the two or more of the plurality of wager amounts have been applied to first wager option; and determining the first prize when the plurality of symbols displayed at the plurality of display positions include the first symbol based on the two or more of the plurality of wager amounts concurrently applied to the first wager option in the player-selected combination having the predetermined number of player-selected symbols.

15. The non-transitory computer-readable medium of claim 14, wherein the first wager option indicates two or more of the first symbol to occur to win the first prize, wherein the instructions, when executed, further cause the game controller to perform the step of evaluating the plurality of symbols displayed for the two or more of the first symbol.

16. The non-transitory computer-readable medium of claim 14, wherein the instructions, when executed, further cause the game controller to perform the step of providing additional game symbols in the game symbol set to widen the plurality of wager options available to a player.

17. The non-transitory computer-readable medium of claim 14, wherein the plurality of wager options include a plurality of player-selectable pay lines.

18. The non-transitory computer-readable medium of claim 17, wherein the two or more of the plurality of wager amounts include a first wager amount and a second wager amount, wherein the instructions, when executed, further cause the game controller to perform the steps of receiving the first wager amount and the second wager amount at a first player-selectable pay line, and receiving the first wager amount and a different third wager amount at a different second play-selectable pay line.

19. The non-transitory computer-readable medium of claim 14, wherein the two or more of the plurality of wager amounts include a first wager amount and a second wager amount, wherein the instructions, when executed, further cause the game controller to perform the steps of receiving the first wager amount and the second wager amount at the first wager option, and receiving the first wager amount and a different third wager amount at a second wager option.

20. The non-transitory computer-readable medium of claim 19, wherein the instructions, when executed, further cause the game controller to perform the step of highlighting the first wager amount, the second wager amount, and the different third wager amount.

\* \* \* \* \*